United States Patent [19]

Burns

[11] Patent Number: 5,023,307

[45] Date of Patent: Jun. 11, 1991

[54] METHYLPOLYSILANES HAVING CONTROLLABLE RHEOLOGY AND METHOD FOR THEIR PREPARATION

[75] Inventor: Gary T. Burns, Midland, Mich.

[73] Assignee: Dow Corning Corporation, Midland, Mich.

[21] Appl. No.: 223,012

[22] Filed: Jul. 22, 1988

[51] Int. Cl.$^5$ ............................................. C08G 77/04
[52] U.S. Cl. ....................................... 528/29; 528/14; 528/33; 501/88; 501/95
[58] Field of Search ............... 528/29, 33, 14; 501/88, 501/95

[56] References Cited

U.S. PATENT DOCUMENTS

| Re. 31,447 | 11/1983 | Baney et al. | 264/65 |
| 3,165,494 | 1/1965 | Smith | 260/37 |
| 4,298,558 | 11/1981 | Baney et al. | |
| 4,310,651 | 1/1982 | Baney et al. | |
| 4,618,551 | 10/1986 | Stolka et al. | 430/58 |
| 4,667,046 | 5/1987 | Frey et al. | |

OTHER PUBLICATIONS

Ryan et al, 84 J. Amer. Chem. Soc. 4730 (1962).
Watanabe et al, J.C.S. Chem. Comm. 534 (1977).
Watanabe et al, J.C.S. Chem. Comm. 704 (1977).
Watanabe et al, 128 J. Organometallic Chem. 173 (1977).
Watanabe et al, J.C.S. Chem. Comm. 1029 (1978).
Watanabe et al, 218 J. Organometallic Chem. 27 (1981).
Watanabe et al, 244 J. Organometallic Chem. 329 (1983).
Atwell et al, 7 J. Organometallic Chem. 71 (1967).

*Primary Examiner*—Edward A. Miller
*Attorney, Agent, or Firm*—Killworth, Gottman, Hagan & Schaeff

[57] ABSTRACT

A process for the preparation of a methylpolysilane having a controllable rheology, including a controllable glass transition temperature is provided which includes the steps of heating together at least one alkoxy-functional disilane selected from the group consisting of disilane having three and four alkoxy groups bonded to the silicon atoms, and mixtures thereof, with an amount of a dialkoxy disilane effective to control the glass transition temperature of the resulting polymer within the range of from about 0° to about 200° C. The reaction is carried out in the presence of a catalyst which is a source of alkoxide ions to catalyze the redistribution reaction. The redistribution reaction produces oligomer and longer chain polymeric silanes having greater than seven silicon atoms in the polymer chain. Methylpolysilanes formed in accordance with the practice of the present invention may then be readily formed into fibers by a conventional spinning process. Alternatively, the methylpolysilanes of the present invention may also find use as binders, coatings, and films for ceramic compositions. The methylpolysilanes may be pyrolyzed to form ceramic compositions.

9 Claims, No Drawings

METHYLPOLYSILANES HAVING CONTROLLABLE RHEOLOGY AND METHOD FOR THEIR PREPARATION

BACKGROUND OF THE INVENTION

The present invention relates to the preparation of methylpolysilanes having controllable rheologies, and more particularly to a method of preparing such methylpolysilanes by a catalyzed redistribution of alkoxydisilanes, and the methylpolysilanes produced thereby.

In recent years, workers in the art have developed procedures for the preparation of silicon carbide ceramic materials from polymeric silane precursors such as methylpolysilanes. Silicon carbide possesses a number of desirable properties such as chemical inertness, semiconducting properties, extreme hardness and stability at very high temperatures. Accordingly, silicon carbide ceramics have found use in electrical heating units, furnace walls, mufflers, abrasives, rocket nozzles, and automotive and turbine engine parts. Further, it has been found that the use of polymeric precursors permits the formation of fibers and thin films or coatings of silicon carbide which were heretofore extremely difficult to form using inorganic sources of silicon carbide.

Where the ceramic precursor polymers are to be spun into fibers, it is highly desirable that such polymers have rheology characteristics which make them amenable to conventional dry or melt fiber spinning technologies. While the molecular weight of a polymer will have some effect on its suitability for spinning, the glass transition temperature of the polymer is a strong indicator of the suitability of a given polymer for spinning into fibers. Generally, it is desirable that a polymer which is to be spun have a glass transition temperature in the range of 50° to 200° C. and most preferably from 70° to 150° C.

Baney et al, U.S. Pat. No. 4,310,651, teach a procedure for the preparation of methylpolysilanes having halogen substituents through a catalyzed redistribution reaction utilizing tetrabutylphosphonium chloride as the catalyst. The Baney et al process has the advantage of being able to utilize as a starting material the process residue from the direct synthesis of organochlorosilanes. Direct synthesis of organochlorosilanes involves passing the vapor of an organic chloride over heated silicon and a catalyst. See, Eaborn, Organosilicon Compounds, Butterworths Scientific Publications. 1960, page 1. This residue contains a mixture of di-, tri-, and tetra-substituted halodisilanes.

However, the halogen substituents on the methylpolysilanes of the Baney et al process have resulted in some difficulties in handling the compositions which tend to auto-ignite when exposed to oxygen or moisture. Moreover, pyrolysis of the compositions releases large quantities of corrosive HCl or HBr gases which must be handled and properly disposed of. Additionally, the methylpolysilanes of the Baney et al process result in polymers having a fixed glass transition temperature. That is, depending upon the starting materials, each of those polymers have a certain glass transition temperature which cannot be modified to make the polymers more amenable to dry or melt spinning procedures.

Baney et al, U.S. Pat. No. 4,298,558, teach an improved procedure which converts the halogen substituents on the methylpolysilanes to alkoxy or phenoxy substituents. However, the improved procedure still requires a two step process of converting halodisilanes to halo-substituted methylpolysilanes and then converting the halogen substituents to alkoxy or phenoxy-substituted compositions. However, the derivatization of these polymers does not provide an effective method for modifying or controlling their glass transition temperatures.

Other workers have attempted to produce methylpolysilanes by a single step redistribution reaction using methoxydisilane starting materials. For example, Ryan et al, 84 J. Amer.Chem.Soc. 4730 (1962), reported the redistribution of 1,1,2,2-tetramethoxy-1,2-dimethyldisilane to higher polysilanes in the presence of sodium metal. Watanabe et al, in a series of published reports, taught that metal alkoxide catalysts could be used in the redistribution reaction. See, e.g., Watanabe et al, J.C.S. Chem. Comm. (1977) 534; Watanabe et al, J.C.S. Chem. Comm. (1977) 704; Watanabe et al, 128 J. Organometallic Chem. 173 (1977); Watanabe et al, J.C.S. Chem. Comm.. (1978) 1029; Watanabe et al, 218 J. Organometallic Chem. 27 (1981); and Watanabe et al, 244 J. Organometallic Chem. 329 (1983).

Atwell et al, 7 J. Organometallic Chem. 71 (1967), have also reported the redistribution of alkoxy disilanes to higher organopolysilanes. However, in the Watanabe and Atwell reports, the higher organopolysilane was either uncharacterized, unidentified, or was of a low molecular weight (less than 6 silicon atoms in the chain).

More recently, Frey et al, U.S. Pat. No. 4,667,046 teach a method for preparing higher molecular weight methylpolysilanes by reacting a trialkoxysubstituted disilane, and optionally a tetraalkoxysubstituted disilane, with a silane having at least one silicon to hydrogen bond in the presence of an alkali metal alkoxide catalyst. The methylpolysilanes are taught to be useful as negative photoresist coatings and ceramic precursors. However, Frey does not teach the ability to modify or control the rheology characteristics of the methylpolysilanes so produced.

Accordingly, the need still exists in the art for a process for the preparation of ceramic precursor polymers which have controllable rheologies, including controllable glass transition temperatures.

SUMMARY OF THE INVENTION

The present invention meets that need by providing methylpolysilanes having controllable rheologies, including controllable glass transition temperatures for enhancing the spinning of such polymers into fibers. The methylpolysilanes are halogen free and can use mixtures of alkoxy-functional disilanes as starting materials.

In accordance with one aspect of the present invention, a process for the preparation of a methylpolysilane having a controllable glass transition temperature is provided comprising the steps of heating together to form a reaction mixture at least one alkoxy-functional disilane selected from the group consisting of disilanes having three and four alkoxy groups bonded to the silicon atoms, and mixtures thereof, with an amount of a dialkoxy disilane effective to control the glass transition temperature of the resulting polymer within the range of about 0° to about 200° C. The reaction is carried out in the presence of a catalyst which is a source of alkoxide ions to catalyze the redistribution reaction. The redistribution reaction produces oligomer and longer chain polymeric silanes having greater than seven silicon atoms in the polymer chain.

As the reaction proceeds by-produced volatile alkoxysilane materials are separated from the reaction mixture. The mixture is reacted for a time sufficient for an alkoxy-functional methylpolysilane having a controlled glass transition temperature to form. The catalyst may then be separated from the alkoxy-functional methylpolysilane which has formed by any suitable means such as by dissolving the reaction product in a solvent and filtering to remove the catalyst.

The reaction is preferably carried out at a temperature of between about 200° to about 320° C., at which temperature the volatile monomer by-products may be distilled from the reaction mixture. Most preferably, the reaction is carried out at a temperature of between about 250° to about 300° C. Some care must be taken in the heating of the reaction mixture. It is preferred that the reaction mixture is heated at a rate of between about 1° to about 5° C. per minute.

The catalyst is a source, either directly or indirectly, of alkoxide ions such as an alkali metal methoxide or alkali metal alkoxide having from 1 to 6 carbon atoms. It is preferably present in an amount of between about 0.1 to about 10.0% and most preferably about 1.0% by weight. The alkoxydisilane starting materials preferably have from 1 to 4 carbon atoms in the alkoxy substituents. Methoxy and ethoxy substituents are most preferred.

The glass transition temperature of the resulting methylpolysilane product is preferably in the range of between about 20° to about 200° C., and most preferably in the range of between about 70° to about 150° C. Methylpolysilanes formed in accordance with the practice of the present invention may then be readily formed into fibers by a conventional spinning process. Alternatively, the methylpolysilanes of the present invention may also find use as binders, coatings, and films for ceramic compositions. The methylpolysilanes may be pyrolyzed to form ceramic compositions. Being halogen free, the polymers are less corrosive to equipment and do not generate HCl or HBr when pyrolyzed.

Accordingly, it is an object of the present invention to provide novel methylpolysilanes having controllable rheologies, including controllable glass transition temperatures. This, and other objects and advantages of the present invention, will become apparent from the following detailed description and the appended claims.

DESCRIPTION OF THE PREFERRED EMBODIMENTS

The present invention involves the catalyzed redistribution of certain alkoxy-functional disilane starting materials to form methylpolysilanes having alkoxy substituents and polymer chain lengths of greater than seven silicon atoms. By suitable selection of the starting materials, the rheology, including the glass transition temperature of the methylpolysilanes produced may be controlled within a narrow desirable temperature range. It has been found that the amount of di-functional disilane added to the reaction mixture has a direct effect on lowering the glass transition temperature of the resulting polymer. The disilane starting materials include at least one disilane selected from disilanes having three and four alkoxy groups bonded to the silicon atoms and having from 1 to 4 carbons in the alkoxy group. Methoxy and ethoxy substituted disilanes are preferred.

To control the polymer rheology, an effective amount of a dialkoxy-functional disilane is added to the tri- and/or tetra- functional disilanes to form a reaction mixture. While such an amount may vary depending upon the particular starting materials selected it has been found that the addition of as little as 1 mole % of the di-functional disilane has an effect on lowering the glass transition temperature of the resulting methylpolysilane polymer. Preferably, between about 2 and about 20 mole % di-functional disilane is added to the reaction mixture, with increasing amounts having greater effects on lowering the glass transition temperature.

Suitable disilane starting materials include tri- and tetra- substituted alkoxy disilanes. The alkoxy functional groups may contain from 1 to 4 carbon atoms. Alkoxy groups having greater than four carbon atoms increase steric hindrance for the catalyzed redistribution reaction and have high boiling points. Methoxy and ethoxy functional groups are preferred. Specific tri- and tetra-alkoxy disilanes which are suitable for use in the present invention include, but are not limited to, 1,2-dimethyl-1,1,2,2-tetramethoxy disilane and 1,1,2-trimethoxy-1,2,2-trimethyl disilane. As the rheology and glass transition control agent, suitable di- alkoxy functional starting materials include, but are not limited to 1,2-diethoxy-1,1,2,2-tetramethyldisilane. 1,2-dimethoxy-1,1,2,2-tetramethyl disilane, and 1,2-dibutoxyx-1,1,2,2,-tetramethyldisilane.

The di-, tri-, and tetra- alkoxy functional disilanes may be prepared reacting the corresponding chloro-substituted disilanes with methanol or trimethyl orthoformate in accordance with the procedure taught by Watanabe et al, 128 J. Organometallic Chem. 173 (1977). A source of chloro-substituted disilanes is as a component of the residue from the direct synthesis process for organochlorosilanes. In practice, the disilanes in the residue are separated from monomeric silanes by a simple distillation process.

The redistribution reaction is carried out by treating the alkoxy functional disilane starting materials, including the rheology controlling di-functional disilane, with an amount of catalyst which is sufficient to initiate the redistribution reaction. This amount is preferably from about 0.1 to about 10 0% by weight and most preferably about 1.0% by weight, of the catalyst. The catalyst in accordance with the process of the present invention is a nucleophile which is a source, either directly or indirectly, of alkoxide ions.

Direct sources of alkoxide ions includes alkali metal alkoxides such as lithium, potassium, or sodium methoxides or corresponding alkoxides. Preferably, the catalyst selected will have an alkoxide substituent which matches the substituents of the starting material. That is, for example, if methoxy functional disilanes are used as the starting material an alkali metal methoxide catalyst is preferred. A catalyst capable of generating alkoxide ions in situ may also be used. Examples of suitable catalyst compositions include n-butyl lithium or lithium, potassium, or sodium metal.

Either individual tri- and tetra-functional disilane compositions or mixtures thereof may be used as starting materials in the reaction. The starting material, rheology control agent, and catalyst are heated as a reaction mixture to a temperature at which by-produced monomeric silanes are distilled off from the redistribution reaction and separated therefrom.

The temperature of the reaction mixture must be sufficiently high to enable distillation and separation of monomeric by-products but not high enough to cause the reaction mixture to gel or solidify. A temperature range of about 200° to about 320° C. is preferred, with temperatures in the range of about 250 to about 300° C. being most preferred. It is believed that the preferred temperature range is higher than that practiced by the art previously. It has been found that where tetra-functional disilanes are used as the starting material, temperatures at the lower end of the range may be utilized.

The reaction may be carried out neat, or in the presence of a solvent such as tetrahydrofuran. The presence of a solvent during the initial stages of the reaction may tend to aid in accelerating the reaction. The solvent may be removed during the latter stages of the reaction. The reaction is carried out in an inert atmosphere. Argon is preferred; however, other inert gases such as nitrogen may be used. The reaction mixture must be protected from exposure either to oxygen or moisture.

The reaction is carried out for a time sufficient for all volatile by-products to be distilled from the reaction mixture. The rate of heating the reaction mixture should be sufficiently slow to enable fractionation of monomers from the dimers and oligomers forming in the reaction mixture. Heating rates from about 1° to about 5° C. per minute have been found to be suitable.

After the reaction to form the methylpolysilanes is completed, the catalyst may be removed from the polymer by any suitable means. A preferred method of removal is by dissolving the polymer in a solvent which will not react with the methylpolysilane polymer such as for example, toluene, tetrahydrofuran, acetonitrile, or saturated hydrocarbons such as hexane or heptane. The solution may then be filtered to remove any catalyst.

The process of the present invention provides halogen free methylpolysilanes having controllable rheologies, including controllable glass transition temperatures, which make them particularly suitable to be formed into fibers by either melt or dry spinning techniques. The methylpolysilanes of the present invention may also find use as ceramic precursors such as binders or carriers for ceramic powders.

The presence of di-functional alkoxy disilanes as rheology control agents in the starting material incorporates dialkyl silicon groups directly into the polymer backbone which is believed to be the mechanism by which the rheology of the polymer is controlled. Fewer branching points are available on the polymer, rendering it more linear in nature and resulting in a composition having a lower glass transition temperature. Prior processes using halo-functional disilanes could not incorporate such difunctional disilanes into the polymer. Additionally, incorporation of long chain alkyl groups onto the alkoxy functional groups of the polymer does not lower the glass transition temperature of the polymer.

The methylpolysilanes of the present invention are also useful as photoresists, coatings for electronic devices, and coatings for ceramic articles to improve oxidation and thermal stabilities as well as wear resistance. The methylpolysilanes may also find use as infiltrants for composite articles.

The glass transition temperature controlled methylpolysilanes produced by the practice of the present invention may be used directly, or may be derivatized by reacting the alkoxy functionality to provide methylpolysilanes with other functional groups. These may include reaction with an organo alkali metal such as methyl lithium to substitute alkyl groups for the alkoxy groups, reaction with a Grignard reagent (RMgBr) to substitute alkyl groups for the alkoxy groups, or reaction with an alkali metal hydride to substitute hydrido groups for the alkoxy groups. Additionally, if desired, a chloro or halogen functionality may be introduced by reacting with an acetyl chloride or halide. An amino functionality may be introduced into the methylpolysilanes by reacting the chloro or halogen groups with an amine such as monomethylamine.

The novel methylpolysilanes may be pyrolyzed to form ceramics by heating the polymer in an inert atmosphere at temperatures of from about 1000° to about 1600° C. for about 0.1 to about 4 hours. Depending upon the functional groups on the polymer, silicon carbide as well as SiCN compounds can be formed.

In order that the inVention may be more readily understood, reference is made to the following examples, which are intended to illustrate the invention, but are not to be taken as limiting the scope thereof.

Unless otherwise, stated, all of the manipulations in these Examples were performed in dry glassware under an atmosphere of argon. Toluene was distilled from sodium under argon prior to use $^1$H NMR spectra were recorded on either a Varian EM 360 or EM 390 spectrometer. FTIR spectra were recorded on a Nicolet 5 DX spectrometer. GPC data were obtained on a duPont Instruments GPC equipped with a Spectra Physics SP4100 Integrator with refractive index and ultraviolet light detectors from duPont Instruments. TGA and TMA data were recorded on a duPont 940 thermomechanical analyzer and an Omnitherm TGA interfaced to an Omnitherm 2066 computer. Gas chromatography was performed on a Varian 3700 GC equipped with a thermoconductivity detector using a ⅛ inch×13 foot column packed with 15% OV-210 on acid-washed Chromasorb P. Oxygen analysis was performed on a LECO oxygen analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry. Carbon, hydrogen and nitrogen analyses were done on a Control Equipment Corporation 240-XA Elemental Analyzer. All percents are by weight unless otherwise indicated. A methyl group is designated by "Me".

EXAMPLE 1

A methylpolysilane polymer (MPS) was prepared using a mixture of tri- and tetra- alkoxy disilane starting materials. A 3-neck 100 mL round bottom flask fitted with an argon inlet, an overhead mechanical stirrer and a 6" vigreoux connected to a short path distillation head with a cooled (−78° C.) receiving flask was cooled to 0° C. Then, 6.80 mL of 1.55 M butyl lithium in hexane (0.0105 mole) was added, followed by 0.400 mL (0.32 g, 0.01 mole) of absolute methanol. The flask was warmed to room temperature and 32.213 g of methoxydisilanes (30.8:42.6 GC area ratio of $(MeO)_2MeSiSi(OMe)Me_2$ and syn-$(MeO)_4Si_2Me$) was added.

Under a slow purge of argon, the reaction was heated to 300° C. (external thermocouple) over a period of 5 hours. The volatiles were collected in the cooled receiving flask. After 30 minutes at 300°, the reaction was cooled to room temperature. The residue was dissolved in 40–50 mL of dry, degassed toluene and the toluene solution filtered through a pad of celite on a medium glass frit. Concentration of the filtrate at reduced pressure gave 5.65 g (17.5% yield) of a yellow, soluble resin. The distillate (23.97 g) consisted of 6.8 area % hexanes, 18.2 area % Me$_2$Si(OMe)$_2$ and 73.0 area % MeSi(OMe)$_3$.

The polymer was analyzed, and the results are reported below.

$T_g = 92.6°$ C.

TGA (1000° C., N$_2$) = 44.6% residue.

$^1$H NMR (CDC$_3$), δ(ppm): 0.30 center of broad singlet, SiMe), 3.47 (center of broad singlet, SiOMe);- SiMe/SiOMe ratio = 5.41/1.0.

FTIR (thin film), cm$^{-1}$(intensity): 2953 (m), 2889 (m), 2834 (m), 2074(w), 1406 (m), 1244 (m), 1180 (w), 1074 (s), 835 (m), 766 (s), 681 (m), 519 (s).

GPC: $M_w = 4775$, $M_n = 1786$,

Elemental analysis: 55.1% silicon, 32.3% carbon and 8.6% hydrogen

EXAMPLE 2

Using the apparatus, catalyst amounts, and isolation procedure of Example 1, a methylpolysilane was prepared using 22.98 g of methoxydisilanes (30.8:42.6 GC area ratio of (MeO)$_2$MeSiSi(OMe)Me$_2$ and syn-(MeO)$_4$Si$_2$Me$_2$) and 5.900 g (0.033 mole) of 1,2-dimethoxy-1,1,2,2-tetramethyldisilane.

Under a slow purge of argon, the reaction was heated to 340° C. (external termocouple) over a period of several hours. The volatiles were collected in the cooled receiving flask. After 30 minutes at 300°, the reaction was cooled to room temperature. After work-up, 5.31g (18.4% yield) of a yellow, soluble resin was obtained. The distillate (22.028 g) consisted of 13.8 area % hexanes, 21.4 area % Me$_2$Si(OMe)$_2$ and 60.4 area % MeSi(OMe)$_3$.

The polymer was analyzed, and the results are reported below. As can be seen, the addition of the dialkoxy functional disilane had the effect of lowering the glass transition temperature of the resulting polymer to below room temperature.

$T_g =$ viscous oil

TGA(1000° C., N$_2$) = 8.2% residue $^1$H NMR (CDCl$_3$), δ(ppm): 0.26 (center of broad singlet, SiMe), 3.40 (center of broad singlet, SiOMe), 3.48 (center of broad singlet, SiOMe); SiMe/SiOMe ratio = 5.4/1.0

FTIR (thin film), cm$^{-1}$(intensity): 2953 (m), 2895 (m), 2826 (m), 2074 (w), 1406 (m), 1244 (m), 1188 (w), 1082 (s), 1032 (sh) 835 (m), 766 (s), 681 (m).

GPC: $M_w = 1663$, $M_n = 974$

EXAMPLE 3

Using the apparatus, catalyst amounts, and isolation procedure of Example 1, a methylpolysilane was prepared using 31.50 g (0.15 mole) 1,2-dimethyl-1,1,2,2-tetramethoxydisilane. Under a slow purge of argon, the reaction was heated to 260° C. (external thermocouple) over a period of 2 hours and then cooled to room temperature. The volatiles were collected in the cooled receiving flask. After work-up, 5.12 g (16.3% yield) of a yellow, soluble resin was obtained.

The polymer was analyzed, and the results are reported below.

$T_g = >200°$ C.,

TGA(1000° C., N$_2$) = 64.4% residue, $^1$H NMR (CDCl$_3$), δ(ppm): 0.40 (center of broad singlet, SiMe), 3.50 (center of broad singlet, SiOMe); SiMe/SiOMe ratio = 3.1/1.0.

FTIR (thin film), cm$^{-1}$(intensity): 2953 (m), 2895 (m), 2834 (w), 1462 (w), 1406 (w), 1244 (s), 1180 (w), 1074 (s), 758 (s), 681 (m), 513 (s)

GPC: $M_w = 23543$, $M_n = 4457$,

Elemental Analysis: 46.8% silicon, 32.0% carbon and 8.3% hydrogen,

EXAMPLE 4

Using the apparatus, catalyst amounts, and isolation procedure of Example 1, a methylpolysilane was prepared using 31.50 g (0.15 mole) of 1,2-dimethyl-1,1,2,2-tetramethoxydisilane. Under a slow purge of argon, the reaction was heated to 210° C. (external thermocouple) over a period of 2 hours and then cooled to room temperature. The volatiles were collected in the cooled receiving flask. After work-up 5.19 g (16.5% yield) of a yellow, soluble resin was obtained. The distillate (23.97 g) consisted of 13.1 area % hexanes and 85.6 area % MeSi(OMe)$_3$.

The polymer was analyzed, and the results are reported below.

$T_g = >200°$ C.

$^1$H NMR (CDCl$_3$), δ(ppm): 0.42 (center of broad singlet, SiMe), 0.86 (center of broad singlet, SiOMe);3.53 (center of broad singlet, SiOMe); SiMe/SiOMe ratio = 2.9/1.0

FTIR (thin film), cm$^{-1}$(intensity): 2953 (m), 2895 (m), 2834 (ml, 2074 (w), 1454 (w), 1406 (w), 1244 (m), 1180 (w), 1074 (s), 758 (s), 681 (m), 519 (s),

EXAMPLE 5

Using the apparatus, catalyst amounts, and isolation procedure of Example 1, a methylpolysilane was prepared using 31.50 g (0.15 mole) of syn-(MeO)$_4$Si$_2$Me$_2$ and 1.335 g (0.0075 mole) of (MeO)$_2$Si$_2$Me$_4$. Under a slow purge of argon, the reaction was heated to 210° C. (external thermocouple) over a period of 2 hours and then cooled to room temperature. The volatiles were collected in the cooled receiving flask. After work-up, 6.096 g (18.6% yield) of a yellow, soluble resin was obtained. The distillate (23.24 g) consisted of 11.0 area % hexanes, 0.6 area % of Me$_2$Si(OMe)$_2$ and 87.0 area % MeSi(OMe)$_3$.

The polymer was analyzed, and the results are reported below. As can be seen, the addition of the dialkoxy functional disilane had the effect of lowering the glass transition temperature of the resulting polymer.

$T_g = 82.0°$ C.,

TGA (1000° C., N$_2$) = 64.9% residue, $^1$H NMR (CDCl$_3$), δ(ppm): 0.29(center of broad singlet, SiMe) and 3.50 (center of broad singlet, SiOMe); SiMe/SiOMe integration ratio = 3.09/1.0.

FTIR (thin film), cm$^{-1}$(intensity): 2953 (m), 2895 (m), 2826 (m), 1462 (w), 1406 (w), 1244 (m), 1180 (w), 1074 (s), 766 (s), 681 (m).

GPC: $M_w = 3451$, $M_n = 1536$.

Elemental Analysis: 49.2% Silicon, 31.4% carbon, and 9.1% hydrogen.

EXAMPLE 6

Using the apparatus, catalyst amounts, and isolation procedure of Example 1, a methylpolysilane was prepared using 31.52 g (0.15 mole) of syn-(MeO)$_4$Si$_2$Me$_2$ and 2.670 g (0.015 mole) of syn-(Meo)$_2$Si$_2$Me$_4$.

Under a slow purge of argon, the reaction was heated to 211° C. (external thermocouple) over a period of 3 hours and then cooled to room temperature. The volatiles were collected in the colled receiving flask. After work-up, 6.08g (18.0% yield) of a yellow, soluble resin was obtained. The distillate (25.4 g) consisted of 6.7 area % hexanes, 1.1 area % $Me_2Si(OMe)_2$, 90.6 area % $MeSi(OMe)_3$.

The polymer was analyzed and the results are reported below. As can be seen, the addition of 9 mole % di-alkoxy functional disilane had an even greater effect of lowering the glass transition temperature of the resulting polymer.

$T_g = 71.7°$ C.,
TGA(1000° C., $N_2$) = 53.2% residue
$^1H$ NMR (CDCl$_3$), δ(ppm): 0.29(center of broad singlet, SiMe), 3.38 (center of broad singlet, SiOMe), 3.49 (center of broad singlet, SiOMe), SiMe/SiOMe ratio = 3.09/1.0.
FTIR (thin film), cm$^{-1}$(intensity): 2953 (m), 2895 (m), 2826 (w), 1447 (w), 1406 (w), 1244 (m), 1180 (w), 1074 (s), 835 (m), 766 (s), 681 (m).
Elemental Analysis: 48.2% silicon, 31.4% carbon and 9.0% hydrogen.
GPC: Mw = 2984, Mn = 1374.

EXAMPLE 7

Using the apparatus catalyst amounts, and isolation procedure of Example 1 a methylpolysilane was prepared using 31.50 g (0.15 mole) of syn-$(MeO)_4Si_2Me_2$ and 3.333 g (0.0187 mole) of syn-$(MeO)_2Si_2Me_4$.

Under a slow purge of argon, the reaction was heated to 210° C. (external thermocouple) over a period of 2 hours and then cooled to room temperature. The volatiles were collected in the cooled receiving flask. After work-up, 5.26g (15.1% yield) of a yellow, soluble resin was obtained. The distillate (26.6 g) consisted of 10.9 area % hexanes, 1.2 area % $Me_2Si(OMe)_2$ and 86.9 area % $MeSi(OMe)_3$.

The polymer was analyzed, and the results are reported below. As can be seen, the addition of 11.0 mole % of the dialkoxy functional disilane had an even greater effect of lowering the glass transition temperature of the resulting polymer.

$T_g = 36.1°$ C.
TGA (1000° C., $N_2$) = 40.23% residue.
FTIR (thin film), cm$^{-1}$(intensity): 2953 (m), 2895 (m), 2826 (m), 1462 (w), 1406 (w), 1244 (m), 1180 (w), 1074 (s), 766 (s). 681 (m).
GPC: $M_w = 1843$, $M_n = 1289$.
Elemental Analysis: 48.2% silicon, 33.2% carbon and 9.2% hydrogen.

EXAMPLE 8

Using the apparatus, catalyst amounts, and isolation procedure of Example 1, a methylpolysilane was prepared using 31.50 g (0.15 mole) of syn-$(MeO)_4Si_2Me_2$ and 4.00 g (0.0225 mole) of syn-$(MeO)_2Si_2Me_4$.

Under a slow purge of argon, the reaction was heated to 210° C. (external thermocouple) over a period of 2.75 hours and then cooled to room temperature. The volatiles were collected in the cooled receiving flask. After work-up, 5.91 g (16.6% yield) of a yellow, soluble resin was obtained. The distillate (25.9 g) consisted of 13.0 area % hexanes 1.1 area % $Me_2Si(OMe)_2$ and 83.4 area % $MeSi(OMe)_3$.

The polymer was analyzed, and the results are reported below. As can be seen, the addition of the di-alkoxy functional disilane had the effect of lowering the glass transition temperature of the polymer. Comparing the polymer glass transition temperatures of Examples 4–8, it can be seen that the addition of increasing amounts of the di-alkoxy functional disilane increasingly lowers the glass transition temperature of the resulting polymer.

$T_g = 12.8°$ C.
TGA (1000° C., $N_2$) = 33.8% residue.
$^1H$ NMR (CDCl$_3$), δ(ppm): 0.29 (center of broad singlet, SiMe), 3.38 (center of broad singlet), 3.50 (center of broad singlet, SiOMe), SiMe/SiOMe integration ratio = 3.2/1.0.
FTIR (thin film), cm$^{-1}$(intensity): 2953 (m), 2895 (m), 2826 (m), 2074 (w), 1462 (w), 1406 (w), 1244 (m), 1180 (w), 1074 (s), 1026 (sh), 766 (s), 681 (m).
GPC: $M_w = 46995$, $M_n = 1036$.

EXAMPLE 9

An attempt was made to lower than the glass transition temperature of a methylpolysilane by the addition of long chain alkyl trimethoxy silanes to the polymer. A 3-neck 100 mL round bottom flask fitted with an argon inlet, an overhead mechanical stirrer and a 6" vigreoux connected to a short path, distillation head with a cooled (−78° C.) receiving flask was cooled to 0° C. Then, 6.80 mL of 1.55M n-butyllithium in hexane (0.0105 mole) was added followed by 0.400 mL (0.32g o.01 mole) of absolute methanol. The flask was warmed to room temperature and 31.50 g (0.15 mole) of syn-$(MeO)_4Si_2Me_2$ and 1.749 g (0.0075 mole) of $(MeO)_3SiC_8H_{17}$ added. Under a slow purge of argon, the reaction was heated to 206° C. (external thermocouple) over a period of 2.50 hours and then cooled to room temperature. The distillate yield was 25.5 g. The residue was insoluble in toluene indicating a highly cross-linked polymer having a very high glass transition temperature.

EXAMPLE 10

Using the apparatus, catalyst amounts, and isolation procedure of Example 9, an alkyl modified methylpolysilane was prepared using 31.50 g (0.15 mole) of syn-$(MeO)_4Si_2Me_2$ and 3.508 g (0.015 mole) of $(MeO)_3SiC_8H_{17}$. Under a slow purge of argon, the reaction was heated to 200° C. (external thermocouple) over a period of 1.5 hours and then cooled to room temperature. The residue was insoluble in toluene indicating a highly cross-linked polymer having a very high glass transition temperature.

EXAMPLE 11

Using the apparatus, catalyst amounts, and isolation procedure of Example 9, an alkyl modified methylpolysilane was prepared using 31.50 g (0.15 mole) of syn-$(MeO)_4Si_2Me_2$ and 4.08 g (0.022 mole) of methylphenyldimethoxy silane ($PhMeSi(OMe)_2$). Under a slow purge of argon, the reaction was heated to 217° C. (external thermocouple) over a period of 3.0 hours and then cooled to room temperature. The distillate yield was 26.2 g. The residue was dissolved in toluene and an aliquot analyzed by gas chromatography. Approximately 8 area % of the analyte was $PhMeSi(OMe)_2$. Assuming a response factor of 1 for both the disilane and the $PhMeSi(OMe)_2$, this corresponds to approximately 4 grams of $PhMeSi(OMe)_2$. Thus, the $PhMeSi(OMe)_2$ was not incorporated into the polymer.

EXAMPLE 12

Samples of methylpolysilane polymers prepared in Examples 1 and 3–8 were pyrolyzed to demonstrate their utility as ceramic precursors. The samples were weighed into alumina boats inside a VAC inert atmosphere box. The samples were transferred, inside a sealed bag, to a 2" Lindberg tube furnace. The samples were removed from the o bag and rapidly transferred into the center of the furnace tube. The furnace tube was evacuated to 0.5 torr and then backfilled with ultra high purity argon. The evacuation/backfilling procedure was repeated two more times. A constant purge of argon was swept through the tube and the samples heated to 1200° C. at 5°/minute with a two hour hold at 1200° C. After cooling to room temperature, the chars were removed from the furnace, weighed and portions analyzed for silicon, oxygen, carbon, hydrogen, and nitrogen. The elemental analysis data is summarized in Table 1.

TABLE 1

| Example | Polymer | Char Yield | | 1200° (Argon) Char Analysis | | |
|---|---|---|---|---|---|---|
| | | TGA | Bulk* | Silicon | Carbon | Hydrogen |
| 1 | MPS-OMe | 44.6 | 27.7** | 64.8 | 23.6 | 5.7 |
| 3 | MPS-OMe | 64.4 | 57.6 | 64.2 | 23.9 | 7.5 |
| 4 | MPS-OMe | — | 52.2 | 65.4 | 22.6 | 7.9 |
| 5 | MPS-Me$_2$Si-OMe | 64.9 | 58.0 | 63.4 | 26.6 | 7.8 |
| 6 | MPS-Me$_2$Si-OMe | 53.2 | 31.4 | 65.3 | 30.8 | 2.4 |
| 7 | MPS-Me$_2$Si-OMe | 40.2 | 29.1 | 64.2 | 27.4 | 4.7 |
| 8 | MPS-Me$_2$Si-OMe | 33.8 | 14.1 | 66.8 | 24.9 | 3.8 |

*Samples were fired to 1200° C. in argon using a temperature program of room temperature to 1200° C. at 5°/min with a 2 hour hold at 1200° C.
**Some of the sample was lost due to foaming.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for the preparation of a methylpolysilane having a controllable glass transition temperature comprising the steps of:
   a) heating together to form a reaction mixture at least one alkoxy-functional disilane selected from the group consisting of disilanes having three and four alkoxy groups bonded to the silicon atoms, and mixtures thereof, with an amount of a dialkoxy-functional disilane effective to control the glass transition temperature of the resulting polymer within the range of from about 0 to about 200° C. in the presence of a catalyst which is a source of alkoxide ions;
   b) reacting said mixture for a time sufficient for an alkoxy-functional methylpolysilane having a controlled glass transition temperature to form while separating by-produced volatile alkoxysilane materials from said reaction mixture; and
   c) separating said catalyst from said alkoxy-functional methylpolysilane which has formed.

2. The process of claim 1 in which said glass transition temperature range is between about 20 to about 200° C.

3. The process of claim 1 in which said glass transition temperature range is between about 70° to about 150° C.

4. The process of claim 1 in which said reaction mixture is heated at a rate of between about 1° to about 5° C. per minute to a temperature of between about 200° to about 320° C.

5. The process of claim 1 in which said catalyst is present in an amount of about 1.0% by weight.

6. The process of claim 1 in which said at least one alkoxy-functional disilane has from 1 to 4 carbon atoms in said alkoxy substituents.

7. The process of claim 1 including the step of forming said methylpolysilanes into fibers by a spinning process.

8. The process of claim 7 including the step of pyrolyzing said methylpolysilanes to form a ceramic fiber.

9. A halogen free product produced by the process of claim 1.

b) reacting

* * * * *

UNITED STATES PATENT AND TRADEMARK OFFICE
CERTIFICATE OF CORRECTION

PATENT NO. : 5,023,307

DATED : June 11, 1991

INVENTOR(S) : Gary T. Burns

It is certified that error appears in the above-identified patent and that said Letters Patent is hereby corrected as shown below:

| | |
|---|---|
| Col. 2, Line 20, | "Comm..(1978)" should be --Comm., (1978)--. |
| Col. 4, Line 45, | "to about 100%" should be --to about 10.0%--. |
| Col. 6, Line 18, | "the inVention" should be --the invention--. |
| Col. 7, Line 51, | "766(s), 681(m)." should be --766(s), 681(m)-- |
| Col. 7, Line 68, | "=64.4% residue," should be --64.4% residue--. |
| Col. 8, Line 3, | "=3.1/1.0." should be --3.1/1.0--. |
| Col. 8, Line 7, | "Mn=4457," should be --Mn=4457--. |
| Col. 8, Line 9, | "8.3% hydrogen," should be --8.3% hydrogen--. |
| Col. 8, Line 32, | "519 (s)," should be --519 (s)--. |
| Col. 8, Line 52, | "=64.9% residue," should be ---=64.9% residue--. |
| Col. 8, Line 56, | "=3.09/1.0." should be ---=3.09/1.0--. |
| Col. 8, Line 68, | "of syn-(Meo)$_2$" should be --of syn-(MeO)$_2$--. |
| Col. 9, Line 14, | "71.7 C.," should be --71.7°C--. |
| Col. 9, Line 19, | "=3.09/1.0." should be ---=3.09/1.0--. |
| Col. 9, Line 22, | "681 (m)." should be --681 (m)--. |
| Col. 9, Line 49, | "766 (s). 681 (m)." should be --766(s), 681 (m)--. |
| Col. 12, Line 48, | "b) reacting" should be deleted. |

Signed and Sealed this

Fifth Day of January, 1993

Attest:

DOUGLAS B. COMER

Attesting Officer     Acting Commissioner of Patents and Trademarks